United States Patent Office 3,522,289
Patented July 28, 1970

3,522,289
PROCESS FOR PREPARING A 2[1-(2-AMINO-5-PHENYL) - 1 - PHENYLMETHYLAMINO]ACETIC ACID DERIVATIVE
Giles Allan Archer, Essex Fells, and Leo Henryk Sternbach, Upper Montclair, N.J., assignors to Hoffmann-La Roche Inc., Nutley, N.J., a corporation of New Jersey
No Drawing. Original application June 15, 1964, Ser. No. 375,292, now Patent No. 3,370,091, dated Feb. 20, 1968. Divided and this application Apr. 21, 1967, Ser. No. 632,560
Int. Cl. C07c 103/22
U.S. Cl. 260—471                        4 Claims

ABSTRACT OF THE DISCLOSURE

A process for preparing a 2[1 - (2 - amino - 5-phenyl)-1 - phenylmethylamino]acetic acid derivative from a 2-amino benzhydryl halide or 2-amino benzhydryl amine. This derivative is a useful intermediate in the preparation of 1,3,4,5 - tetrahydro - 5 - phenyl-2H-1,4-benzodiazepin-2-ones which are a known pharmaceutically useful class of compounds.

CROSS REFERENCES TO RELATED APPLICATIONS

This application is a divisional application of Ser. No. 375,292, Archer et al., filed June 15, 1964, now U.S. Pat. No. 3,370,091, issued Feb. 20, 1968.

BACKGROUND OF THE INVENTION

The only methods described in the prior art for the formation of 1,3,4,5 - tetrahydro - 5 - phenyl-2H-1,4-benzodiazepin-2-ones involve the preparation of other 1,4-benzodiazepines followed by conversion to the desired 1,3,4,5 - tetrahydro - 5 - phenyl-2H-1,4-denzodiazepin-2-ones. According to the present invention, the latter compounds can be prepared directly from non-heterocyclic compounds. Thus, the present invention comprehends a process which provides a facile route for the preparation of 1,3,4,5 - tetrahydro - 5 - phenyl-2H-1,4-benzodiazepin-2-ones.

DETAILED DESCRIPTION OF THE INVENTION

More particularly, the present invention comprehends a method for the preparation of compounds of the formula:

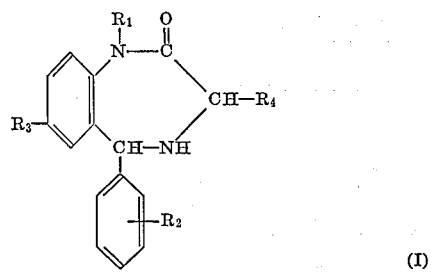

(I)

wherein $R_1$ and $R_4$ are each selected from the group consisting of hydrogen and lower alkyl; $R_2$ is selected from the group consisting of hydrogen, halogen, nitro, trifluoromethyl, lower alkyl and lower alkoxy; and $R_3$ is selected from the group consisting of hydrogen, halogen, trifluoromethyl, nitro, cyano, lower alkyl-thio, lower alkyl-sulfinyl, lower alkyl-sulfonyl, lower alkyl and lower alkoxy;

which comprises intramolecularly condensing a compound of the formula:

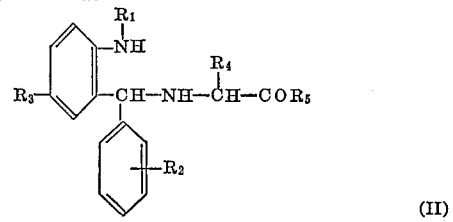

(II)

wherein $R_1$, $R_2$, $R_3$ and $R_4$ have the same meaning as above, and $R_5$ is selected from the group consisting of lower alkoxy, hydroxy, aryloxy and amino.

As used herein, the term lower alkyl comprehends saturated straight and branched chain hydrocarbon groups, for example, methyl, ethyl, propyl, isopropyl and the like. The term halogen comprehends all four halogens, i.e. iodine, bromine, fluorine and chlorine (the latter three being preferred). The terms lower alkyl-thio, lower alkyl-sulfinyl, lower alkyl-sulfonyl and lower alkoxy comprehend moieties wherein the lower alkyl part is as defined for lower alkyl above, for example, methoxy, ethoxy, methyl-thio, methyl-sulfinyl, methyl-sulfonyl and the like. Amino comprehends unsubstituted and substituted amino groups such as —$NH_2$, —NH(lower alkyl) and —N(lower alkyl)$_2$. Aryloxy comprehends aromatic cyclic hydrocarbonoxy groups such as phenoxy and the like.

As stated above, one embodiment of this invention comprehends the preparation of compounds of Formula I via intramolecular condensation of compounds of Formula II. The cmpounds of Formula II, depending on the meaning of $R_5$, are either aminoacetic acids, amino acetates (i.e. esters), or aminoacetamides. While the intramolecular condensation can be effected with any of these, it is preferred to effect the intramolecular condensation utilizing compounds of Formula II which are aminoacetic acids (i.e. $R_5$ is hydroxy). In such instances the intramolecular condensation constitutes a dehydration. The intramolecular condensation can suitably be effected by heating a compound of Formula II in an inert organic solvent. The dehydration embodiment (i.e. $R_5$ is hydroxy) constitutes a specific exemplification of the intramolecular condensation. This dehydration can be effected by any suitable means but preferably is effected by heating in an inert organic solvent. This heating can be effected at temperatures from about 25° C. to about 300° C. but temperatures from about 80° C. to about 200 C. are especially preferred. Exemplary of useful organic solvents are hydrocarbons, for example, aromatic hydrocarbons such as xylene and the like, halogen containing hydrocarbons such as methylene chloride and the like, ethers such as ether, diglyme, tetrahydrofuran and the like, and basic nitrogen containing heterocycles such as pyridine, piperidine or the like. Mixtures of inert organic solvents can also be used to advantage.

Compounds of Formula II which are 2-aminobenzhydrylaminoacetic acids are preferred starting materials for the abovedescribed process and can be prepared by a variety of methods. More particularly, they can be prepared by hydrolysis of corresponding esters or amides of the formula:

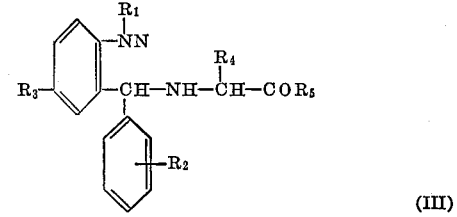

(III)

wherein $R_1$, $R_2$, $A_3$ and $R_4$ have the same meaning as above and $R_5$ is lower alkyloxy, amino or aryloxy.

The compounds of Formula II (including those of Formula III) can be prepared via reaction of corresponding 2-aminobenzhydrylamines with a lower alkyl or aryl haloacetate (bromo and chloroacetate are especially preferred), a halo-acetamide or a halo-acetic acid. This reaction can be effected at room temperature or at above or below room temperature. Moreover, it is suitably effected in an inert organic solvent, for example a hydrocarbon, such as benzene, toluene or the like, preferably in the presence of an acid binding, i.e. acid accepting agent—either inorganic or organic acid binding agents can be used, for example, carbonates such as sodium carbonate, amines such as lower alkyl amines, for example, triethylamine, or the like.

In yet another embodiment, the compounds of Formula II can be prepared from benzhydrylhalides of the formula:

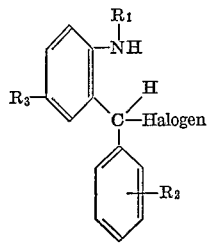 (IV)

wherein $R_1$, $R_2$ and $R_3$ have the same meaning as above; via reaction with a glycine compound of the formula

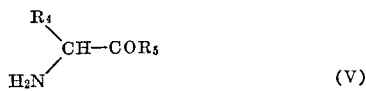 (V)

wherein $R_4$ and $R_5$ have the same meaning as above.

The benzhydryl halides of Formula IV can be prepared by treatment of corresponding benzhydrols with a halogenating agent (iodinating, chlorinating and brominating agents being preferred, chlorinating agents are especially preferred). As exemplary halogenating agents there can be named, thionyl halides such as thionyl chloride and thionyl bromide; phosphorus trihalides or pentahalides such as phosphorus trichloride, phosphorus tribromide or phosphorus pentachloride; or hydrogen halides such as hydrogen chloride or hydrogen bromide; or the like. The so-formed benzhydryl halide can then be isolated (advantageously in the form of its acid addition salt, for example, as the acid addition salt formed during the halogenation reaction) or, preferably, is further reacted by adding the glycine compound of Formula V directly to the reaction mixture in which the benzhydryl halide of Formula IV has been formed. A preferred embodiment of the reaction with a benzhydryl halide of Formula IV constitutes using as the glycine compound of Formula V, a glycine ester (i.e. $R_5$ is lower alkoxy or aryloxy).

The hydrolysis of the aminoacetate ester or aminoacetamide of Formula III to the acetic acid of Formula II is suitably effected via either alkaline or acid hydrolysis and can be effected at either room temperature or above or below room temperature. Preferably, it is effected at above room temperature by refluxing the ester of Formula III in either an acidic or basic aqueous medium.

The following examples are illustrative but not limitative of the invention. All temperatures are stated in ° C.

Example 1

2 - amino - 5 - chlorobenzhydrylamine dihydrochloride (30.6 gm.) was dissolved in water (150 ml.), and made basic with 20% sodium hydroxide solution. Extraction of the mixture with methylene chloride gave 2-amino-5-chloro-benzhydrylamine as a pale yellow viscous oil.

Example 2

2-amino - 5 - chlorobenzhydrylamine (11.64 gm., 0.050 mol), dissolved in dry benzene (100 ml.), was treated with triethylamine (7.2 ml., 10.1 gm., 0.100 mol). The reaction mixture was then stirred in an ice-bath at 0–5°, during the dropwise addition (in the course of 20–30 minutes) of a solution of ethyl bromoacetate (5.52 ml., 8.35 gm., 0.050 mol) in dry benzene (20 ml.). Stirring was then continued for 16 hours at room temperature, which was followed by refluxing the mixture on a steam-bath for one hour. After cooling, the reaction mixture was poured into water, and extracted with methylene chloride, to give a bright yellow oil. This was partitioned between dilute hydrochloric acid and ether; the aqueous acid layer was made basic with sodium hydroxide solution, and extracted with methylene chloride, to give the crude product as a viscous yellow gum. Trituration with hexane, followed by several recrystallizations from hexane, and from ethanol, gave 2-[1-(2-amino-5-chlorophenyl)-1-phenylmethylamino]acetic acid ethyl ester as colorless rods, M.P. 103–104° C.

Example 3

2 - [1-(2-amino-5-chlorophenyl)-1-phenylmethylamino] acetic acid ethyl ester (1.81 gm.) was refluxed in a mixture of saturated methanolic barium hydroxide (30 ml., circa 1 N) and water (10 ml.) for 17 hours. The resulting precipitated barium salt was filtered off after cooling the mixture, and recrystallized from water, giving colorless needles (M.P. 206–210°). The barium salt was then dissolved in dimethylformamide (20 ml.), and converted to the free acid by addition of the calculated amount of 1 N-sulfuric acid, followed by filtration to remove the precipitated barium sulfate. Concentration of the filtrate, and dilution with water, gave 2[1-(2-amino-5-chlorophenyl)-1-phenylmethylamino]acetic acid as pale yellow prisms (from methanol). The melting-point was rather indefinite, circa 234–242° dec.

Example 4

A suspension of 2-[1-(2 - amino - 5 - chlorophenyl)-1-phenylmethylamino]acetic acid (1.00 gm.) in dry xylene (20 ml.) was stirred and refluxed for six hours; some solid material remained undissolved. The mixture was cooled and filtered, giving 7-chloro-1,3,4,5-tetrahydro-5-phenyl-2H-1,4 - benzodiazepin - 2 - one as colorless prisms, M.P. 181–185°.

Example 5

A solution of 2[1-(2-amino-5-chlorophenyl)-1-phenylmethylamino]acetic acid (1.00 gm.) in anhydrous pyridine (10 ml.) and piperidine (0.02 ml.) was refluxed for 17 hours. The mixture was evaporated in vacuo, and the residue was partitioned between diluted hydrochloric acid and ether. The aqueous acid layer was made basic with sodium hydroxide solution, and the resulting precipitate was filtered off and recrystallized from ethanol, giving 7-chloro-1,3,4,5-tetrahydro-5-phenyl - 2H-1,4-benzodiazepin-2-one as colorless prisms, M.P. 183–185° C.

Example 6

2-amino - 5 - chlorobenzhydrylamine dihydrochloride (30.6 gm., 0.100 mol), suspended in ethanol (200 ml.), was treated with anhydrous sodium carbonate (21.2 gm., 0.200 mol); the mixture was refluxed and treated dropwise (in the course of 1 hour) with a solution of ethyl bromoacetate (11.1 ml., 16.7 gm., 0.100 mol) in ethanol (25 ml.). Stirring and refluxing were continued for 24 hours, then the mixture was filtered, and the combined filtrates were concentrated in vacuo. The resulting residue was worked up in the manner described in Example 2 for the preparation of compound 2-[1-(2-amino-5-chlorophenyl)-1-phenylmethylamino]acetic acid ethyl ester, giving a yellow oil. This was hydrolyzed by refluxing it with a mixture of aqueous 1 N-sodium hydroxide solution (120 ml.) and ethanol (240 ml.) for 3 hours. The resulting solution was concentrated in vacuo, diluted with water, and acidified with 3 N-acetic acid (pH 5–6), to give cream-colored prisms containing 2[1-(2-amino-5-chlorophenyl)-1-phenylmethylamino]acetic acid. The so-obtained crude product was cyclized to 7-chloro-1,3,4,5-tetrahydro-5-phenyl-2H-1,4-benzodiazepin-2-one by treatment with refluxing xylene, as described in Example 4 giving tan-colored prisms, M.P. 182–186° C.

Example 7

A solution of 2-amino-5-chlorobenzhydrol (23.4 gm., 0.100 mol) in ethylene dichloride (250 ml.) was stirred and treated with dry hydrogen chloride, which was bubbled through the mixture until excess was present. Then pyridine (2 drops) and thionyl chloride (14.4 ml., 23.8 gm., 0.200 mol) was added, and the mixture was refluxed until evolution of sulfur dioxide virtually ceased (0.5 hour). The mixture was then evaporated in vacuo, with protection from atmospheric moisture. The residue was dissolved in methylene chloride (200 ml.) and evaporated again to remove excess thionyl chloride. The residue so-obtained by evaportaion of the reaction mixture, was dissolved in methylene chloride (60 ml.). The solution was then stirred and cooled in an ice-bath, while a solution of freshly distilled glycine ethyl ester (10.3 gm., 100 millimoles) in methylene chloride (25 ml.), was added dropwise over the course of 30 minutes. The mixture was then stirred for 1 hour at room temperature, and poured into ice-water. The organic layer was then evaporated giving the crude product as a brown, partly crystalline residue. This was partitioned between ether and dilute hydrochloride acid; the acid layer was made basic wtih sodium hydroxide solution, and extracted with methylene chloride, to give the almost pure product, 2-[1-(2-amino-5-chlorophenyl)-1-phenylmethylamino]acetic acid ethyl ester, as a tan-colored crystalline residue. One recrystallization from methylene chloride-hexane gave colorless prisms, M.P. 102–105° C.

We claim:

1. A method for the preparation of compounds of the formula

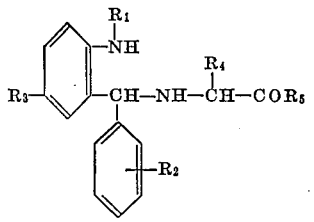

wherein $R_1$ and $R_4$ are each selected from the group consisting of hydrogen and lower alkyl; $R_2$ is selected from the group consisting of hydrogen, halgen, nitro, trifluoromethyl, lower alkyl and lower alkoxy; $R_3$ is selected from the group consisting of hydrogen, halogen, trifluoromethyl, nitro, cyano, lower alkylthio, lower alkyl-sulfinyl, lower alkyl-sulfonyl lower alkyl and lower alkoxy and $R_5$ is selected from the group consisting of hydroxy, lower alkoxy, phenoxy and amino; which comprises reacting a compound of the formula

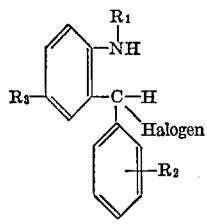

wherein $R_1$, $R_2$ and $R_3$ have the same meaning as above, with a compound of the formula

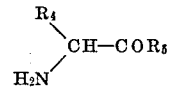

wherein $R_4$ and $R_5$ have the same meaning as above.

2. A method for the preparation of compounds of the formula

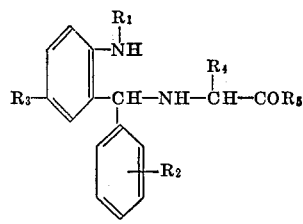

wherein $R_1$ and $R_4$ are each selected from the group consisting of hydrogen and lower alkyl; $R_2$ is selected from the group consisting of hydrogen, halogen, nitro, trifluoromethyl, lower alkyl and lower alkoxy; $R_3$ is selected from the group consisting of hydrogen, halogen, trifluoromethyl, nitro, cyano, lower alkyl-thio, lower alkyl-sulfinyl, lower alkyl-sulfonyl lower alkyl and lower alkoxy and $R_5$ is selected from the group consisting of hydroxy, lower alkoxy, phenoxy and amino;

which comprises reacting a compound of the formula

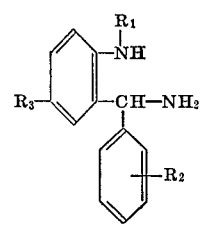

wherein $R_1$, $R_2$ and $R_3$ have the same meaning as above, with a haloacetic acid compound of the formula

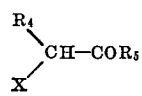

wherein $R_4$ and $R_5$ have the same meaning as above and X is a halogen.

3. A method in accordance with claim 1 wherein a lower alkyl 2[1-(2-amino-5-chlorophenyl)-1-phenylmethylamino]-acetate is formed by reacting a 2-amino-5-chloro-benzhydryl halide with a lower alkyl glycinate.

4. A method in accordance wtih claim 2 wherein a lower alkyl 2-[1-(2-amino-5-chlorophenyl)-1-phenylmethylamino]-acetate is formed by reacting 2-amino-5-chlorobenzhydrylamine with a lower alkyl halo-acetate.

References Cited

Karrer, P., Organic Chemistry (1950), pub. by Elsevier Publishing Co., Inc., New York, p. 453 relied on.

Fieser et al., Organic Chemistry (1956), pub. by Reinhold Publishing Corp., New York, p. 342 relied on.

LORRAINE A. WEINBERGER, Primary Examiner

L. A. THAXTON, Assistant Examiner

U.S. Cl. X.R.

260—239.3, 465, 470, 518, 519, 558, 559, 516